(12) United States Patent
Fabien et al.

(10) Patent No.: US 7,027,824 B2
(45) Date of Patent: Apr. 11, 2006

(54) METHOD AND APPARATUS FOR BROADCAST SERVICE CLASSIFICATION AND NOTIFICATION

(75) Inventors: Jean-Aicard Fabien, Lincolnshire, IL (US); Richard C. Burbidge, Hampshire (GB); Rapeepat Ratasuk, Schaumburg, IL (US)

(73) Assignee: Motorola, Inc., Schaumburg, IL (US)

( * ) Notice: Subject to any disclaimer, the term of this patent is extended or adjusted under 35 U.S.C. 154(b) by 75 days.

(21) Appl. No.: 10/679,022

(22) Filed: Oct. 3, 2003

(65) Prior Publication Data

US 2005/0075147 A1   Apr. 7, 2005

(51) Int. Cl.
*H04Q 7/20* (2006.01)

(52) U.S. Cl. .................................. 455/458; 455/412.1

(58) Field of Classification Search ............. 455/412.2, 455/414.1, 414.3, 466, 458, 574, 522, 115.4, 455/116, 154.1, 158.1, 532.3, 517, 567, 158.2; 370/311, 318, 338, 337, 231, 468, 477; 709/318; 375/147, 134, 356
See application file for complete search history.

(56) References Cited

U.S. PATENT DOCUMENTS

| | | | |
|---|---|---|---|
| 6,252,868 B1 * | 6/2001 | Diachina et al. ............ 370/347 |
| 6,292,508 B1 | 9/2001 | Hong et al. |
| 6,728,300 B1 * | 4/2004 | Sarkar et al. ............... 375/147 |
| 6,826,408 B1 * | 11/2004 | Kim et al. ................... 455/466 |
| 6,834,045 B1 * | 12/2004 | Lappetelainen et al. .... 370/329 |
| 2003/0117969 A1 * | 6/2003 | Koo et al. ................... 370/318 |

FOREIGN PATENT DOCUMENTS

WO   WO 01/60104 A1   8/2001

* cited by examiner

*Primary Examiner*—Jean Gelin
(74) *Attorney, Agent, or Firm*—Randall S. Vaas

(57) ABSTRACT

A system (100) and methods (400, 500) for alerting user equipment devices (116) in a wireless communication network (102) to broadcasts while limiting the amount of power that must be consumed in order to ascertain if the user equipment devices (116) have subscribed to the broadcasts are provided. A communication indicator (300) that is compatible with UMTS protocols and includes, in addition to paging indicators, one or more broadcast category indicator codes (304) is provided. Devices receiving the communication indicator (300) are able to ascertain based on the broadcast category indicator codes (304) whether there is a need to expend further power in determined whether they are subscribed to the broadcast.

20 Claims, 6 Drawing Sheets

METHOD AND APPARATUS FOR BROADCAST SERVICE CLASSIFICATION AND NOTIFICATION

FIELD OF THE INVENTION

The present invention relates in general to wireless communication networks. More particularly, the present invention relates to broadcasting in wireless communication networks.

DESCRIPTION OF RELATED ART

In the last decade a great deal of cellular telephone infrastructure has been installed, and the use of cellular telephones for voice communications has become commonplace. Presently there is an interest in upgrading cellular telephone infrastructure and user equipment to what is generally referred to as 'third generation' or '3G' technology. It is envisioned that 3G networks will surpass older cellular telephone networks in that in addition to voice communications, 3G networks will carry a variety of multimedia communications.

Using cellular networks and user equipment for multimedia communications uses more power in the network infrastructure, in particular in the network base stations, and in the user equipment. In as much as the user equipment is generally battery powered, it is particularly sensitive to increased power requirements. It is anticipated that network operators will be reluctant to implement 3G protocols that substantially increase the power consumption in user equipment that is not using enhanced 3G services such as multimedia. Thus, there is a need to develop new protocols that support 3G services without unduly increasing the power consumption in the network, and in particular not substantially increasing the power consumption of user equipment that is not subscribed to enhanced 3G services.

One type of 3G multimedia service that is anticipated is multimedia broadcasting. By broadcasting, as opposed to separately transmitting to each of a plurality of devices, power and bandwidth is conserved. It is anticipated that users will be able to subscribe to specific broadcast services such as multimedia broadcasts of sports news or music videos. In particular, there is a need for effective broadcast protocols that are compatible with limited functionality user equipment devices, and do not unduly tax the batteries of 3G user equipment devices that are not subscribed to broadcast services.

BRIEF DESCRIPTION OF THE FIGURES

The present invention will be described by way of exemplary embodiments, but not limitations, illustrated in the accompanying drawings in which like references denote similar elements, and in which.

DETAILED DESCRIPTION OF THE PREFERRED EMBODIMENTS

As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms a or an, as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Figure 1:
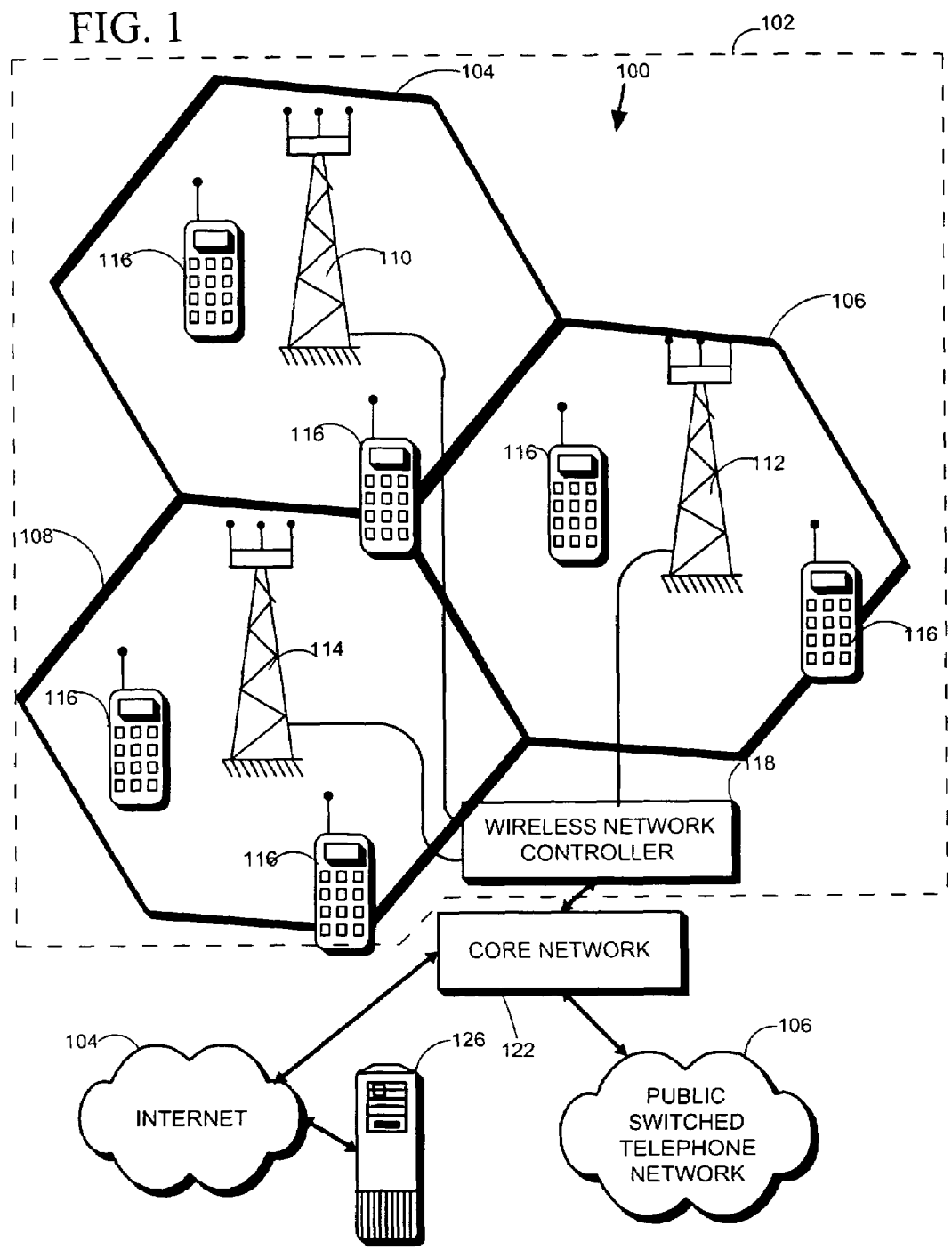
FIG. 1 is an embodiment of a system of interconnected communication networks.

FIG. 1 is an embodiment of a system of interconnected communication networks 100. The system 100 comprises a cellular wireless communication network 102, the Internet 104 and a public switch telephone network (PSTN) 106, that are intercoupled as described further below.

The wireless communication network 102 comprises a first cell 104, a second cell 106, and a third cell 108. The three cells 104–108 include respectively, a first base station 110, a second base station 112, and a third base station 114. A plurality of user equipment devices 116 are distributed throughout an area covered by the three cells 104–108. Although the user equipment devices 116 are depicted as cellular telephones, alternatively other types of user equipment devices 114 such as, for example, wireless communication enabled Personal Digital Assistants, or wireless communication enabled laptop computers are used. A particular broadcast which, for example, includes still images, audio (e.g., news, music), video (e.g., music videos, sports clips), or multimedia is broadcast to a plurality of the user equipment devices 116 in the wireless communication network 102. The wireless communication network 102 further comprises a wireless network controller 118 that is communicatively coupled suitably through a fiber optic, or coaxial transmission lines, to the three base stations 110–114. The wireless network controller 118 directs communication to and from the three base stations 110–114. The wireless network controller 118 handles upper layers of a communication protocol stack running on the wireless communication network 102, and the base stations 110–114 handle one or more lower layers e.g., the physical layer. The wireless communication network 102 suitably runs a modified version of the Universal Mobile Telecommunications System (UMTS) protocol stack. Modifications are described herein below. A single wireless network controller 118 coupled to the three base stations 110–114 is shown for the purpose of illustration, however in practice more than one wireless network controller coupled to additional base stations are provided to support wireless communications over a large geographic area.

A core network 122 is at the periphery of the wireless communication network 102. The core network is coupled to the wireless network controller 118, to the PSTN 106, and to the Internet 104. The core network 122 serves as an interface between the PSTN 106, and the wireless communication network 102, and between the Internet 104, and the wireless communication network 102. A server 126 is coupled to the Internet 104. The server 126 originates or forwards broadcasts which pass through the Internet 104, core network 122, wireless network controller 118, and one or more of the base stations 110–114, before reaching a plurality of the user equipment devices 116.

Figure 2:
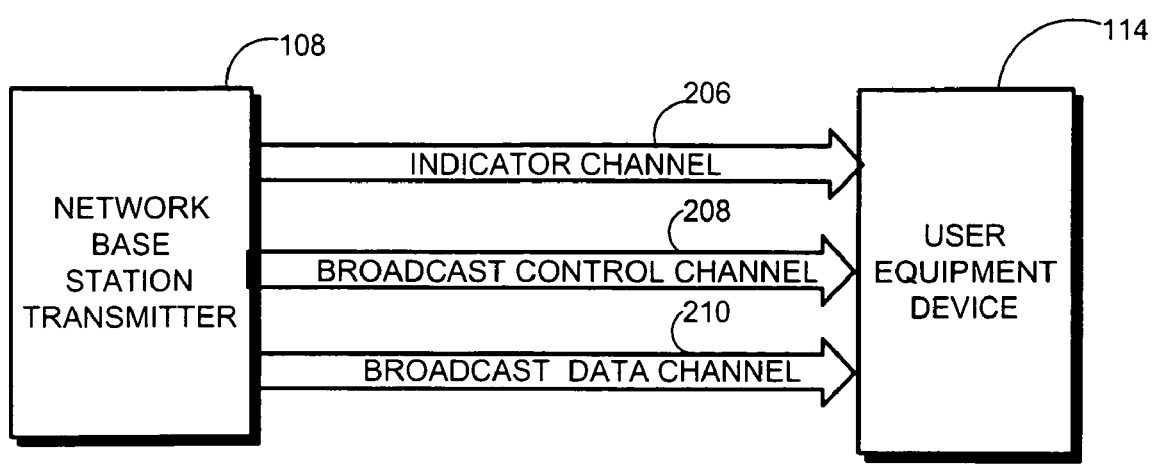
FIG. 2 is a schematic illustration of certain channels involved in sending broadcasts in the system shown FIG. 1.

FIG. 2 is a schematic illustration of certain channels used to send signals between the base station 110–114 and user equipment devices 116 in setting up and sending multimedia data by broadcast. The channels include an indicator channel 206, a broadcast control channel 208 and a broadcast data channel 210.

The indicator channel 206 carries a communication indicator 300 (FIG. 3) that includes paging indicator symbols that are used to alert user equipment devices 116 to an incoming point-to-point communication e.g., a telephone call, and also includes one or more broadcast category indicator codes, and optionally includes parity bits for the latter.

Figure 3:
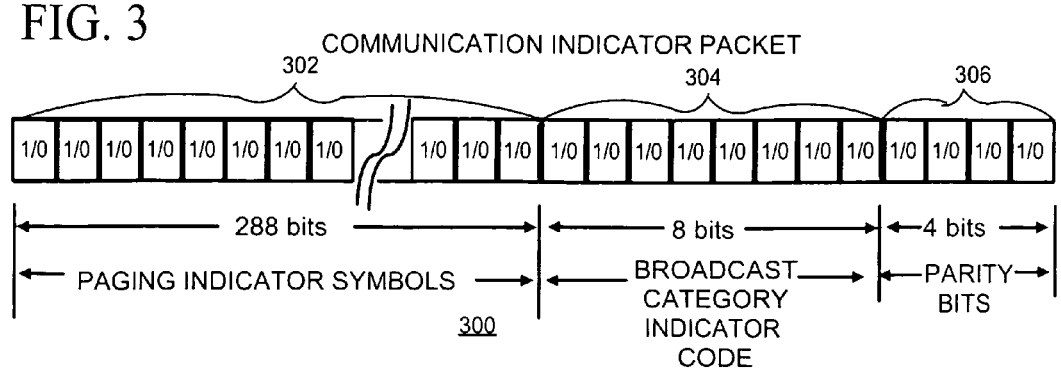
FIG. 3 is a packet diagram of a communication indicator used in the system shown in FIG. 1.

FIG. 3 is a packet diagram of the communication indicator 300 used in the network shown in FIG. 1. The communication indicator 300 is suitably transmitted in the indicator channel 206. The communication indicator 300 includes a plurality of paging indicator symbols 302, encoded in a plurality of bits e.g., 288 bits as indicated in FIG. 3. The paging indicator symbols 302 are followed by one or more broadcast indicator category codes, suitably a single broadcast category indicator code 304. As shown in FIG. 3 the broadcast category indicator code 304 is eight bits in length. The communication indicator 300 further comprises a plurality of parity bits 306 to be used in error correcting the broadcast category indicator code 304. As shown in FIG. 3 the parity bits 306 follow the broadcast category indicator code 304, however the relative placement of the broadcast category indicator code 304 and the parity bits 306 is alternatively varied from what is shown in FIG. 3. Additionally the apportionment of bits between the broadcast category indicator code 304, and the parity bits 306, can be varied depending on expected radio link conditions, and the severity of the need for error correction. Using eight bits for the broadcast category indicator code 304 as shown in FIG. 3 would allows for up to 256 broadcast categories to be specified in the communication indicator 300. Broadcast categories might for example include 'sport news', 'classic rock', 'reggae', and 'stock market news'. Broadcast to be made in the system 100 are categorized into one or more categories each of which is designated by a particular broadcast category code. A particular user of a user equipment device 116 would have the option to subscribe to one or more categories of broadcasts. Optionally one category code, such as a code of all zeros is reserved as a default code to indicate that there is no broadcast. Limited functionality equipment that is not designed to receive broadcasts or 3G user equipment that is not subscribed to broadcast multimedia service, can process the paging indicator symbols 302 portion of the communication indicator 300 and not expend further battery power in processing the broadcast category indicator code 304 or the parity bits 306.

The communication indicator 300 is as long (300 bits long) as the paging indicator (PI) packet adopted in the UMTS, and is otherwise backward compatible with the UMTS PI. The UMTS PI includes 288 paging indicator bits followed by 12 unused bits. Substitution of the communication indicator 300 for the UMTS PI facilitates providing enhanced, power efficient broadcast services, as will be described further below.

Referring again to FIG. 2, the broadcast control channel 208 is used to transmit information specifying control information relative to a broadcast. The control information can for example include: a bit rate of the broadcast, format information for the broadcast, information identifying an application to be used in outputting the broadcast and information about a channel on which the broadcast will be made (e.g., frequency, time slot, spreading code). The broadcast control channel 208 is also used to identify a subcategory within a category identified by the broadcast category indicator code 304. The subcategory information can, for example, specify sports news related to a particular team, music by a particular artist, or stock market news related to a particular company. The subcategory information preferably takes the form of a binary sequence of some length, e.g. eight bits. Broadcasts to be made in the system 100 are, according to certain embodiments, also categorized into particular subcategories.

The last signal shown in FIG. 2 is the broadcast data channel 210 itself. The broadcast data channel 210 suitably includes one or more types of media. Other channels are used in the wireless communication network 102 for other purposes that are outside immediate focus of the present description.

Figure 4:
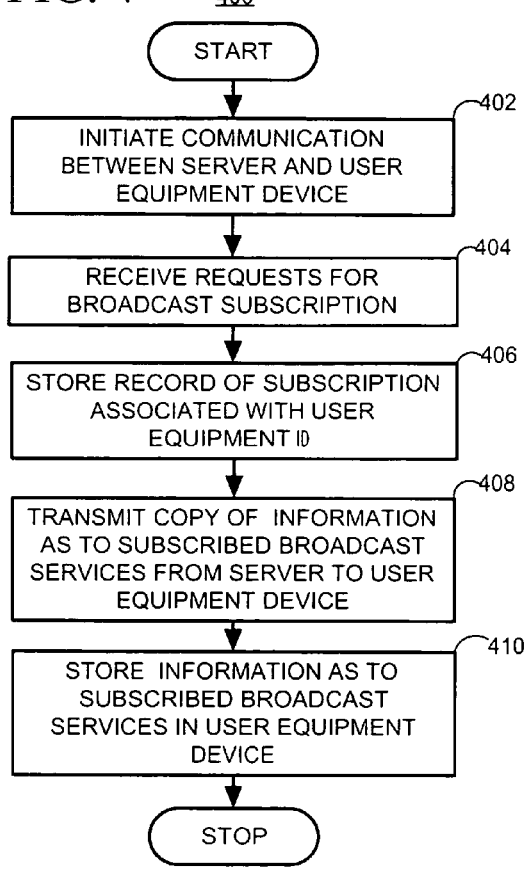
FIG. 4 is a flow chart of a first process conducted in the system shown in FIG. 1.

FIG. 4 is a flow chart of a first process 400 conducted in the system 100 shown in FIG. 1. The first process 400 is used to configure one or more of the user equipment devices 116 to selectively receive certain broadcasts. In block 402 communication is initiated between one of the user equipment devices 116 and a second device in the system 100, such as, for example, the server 126, or another server (not shown). The communication initiated in block 402 is suitably initiated through a web page interface. The user of one of the user equipment device 116 would initiate the communication in order to subscribe to broadcast services. Alternatively, the communication is initiated by the server 126 or another server.

In block 404 a request for one or more broadcast subscriptions is received (e.g., using the aforementioned web interface). In order to receive the users selection the user may be presented with one page in which the user selects a category of broadcast, and in response to such selection, the user may be presented with a second page in which the user selects one or more subcategories within the selected category.

In block 406 a record of the requested broadcast subscriptions including broadcast category and subcategory information along with an ID of the user equipment device 116 from which the request was received is stored. The ID of the user equipment is suitably a part of or the entire International Mobil Subscriber Identity (IMSI) of the user equipment device 116. As described below in reference to FIGS. 5–6, the record is to be used at the time of broadcast to notify subscribed user equipment devices 116 of the availability of the broadcast. The record suitably takes the form of an entry of the ID into a list that is maintained for each broadcast category and subcategory of broadcast.

In block 408 information as to broadcast services which the user has chosen to receive is transferred to the user equipment device 116 that initiated communication. The transfer is for example made from the server 126, through the Internet 104, core network 122, wireless network controller 118, and one of the base stations 110–114. The information received in block 408 suitably includes one or more category codes that are to be matched against the broadcast category indicator code 304 received in the communication indicator 300, and one or more subcategory codes that are to be compared to subcategory codes received through the broadcast control channel 208. In block 410 the information received in block 408 is stored in the user equipment device 116.

Figure 5:
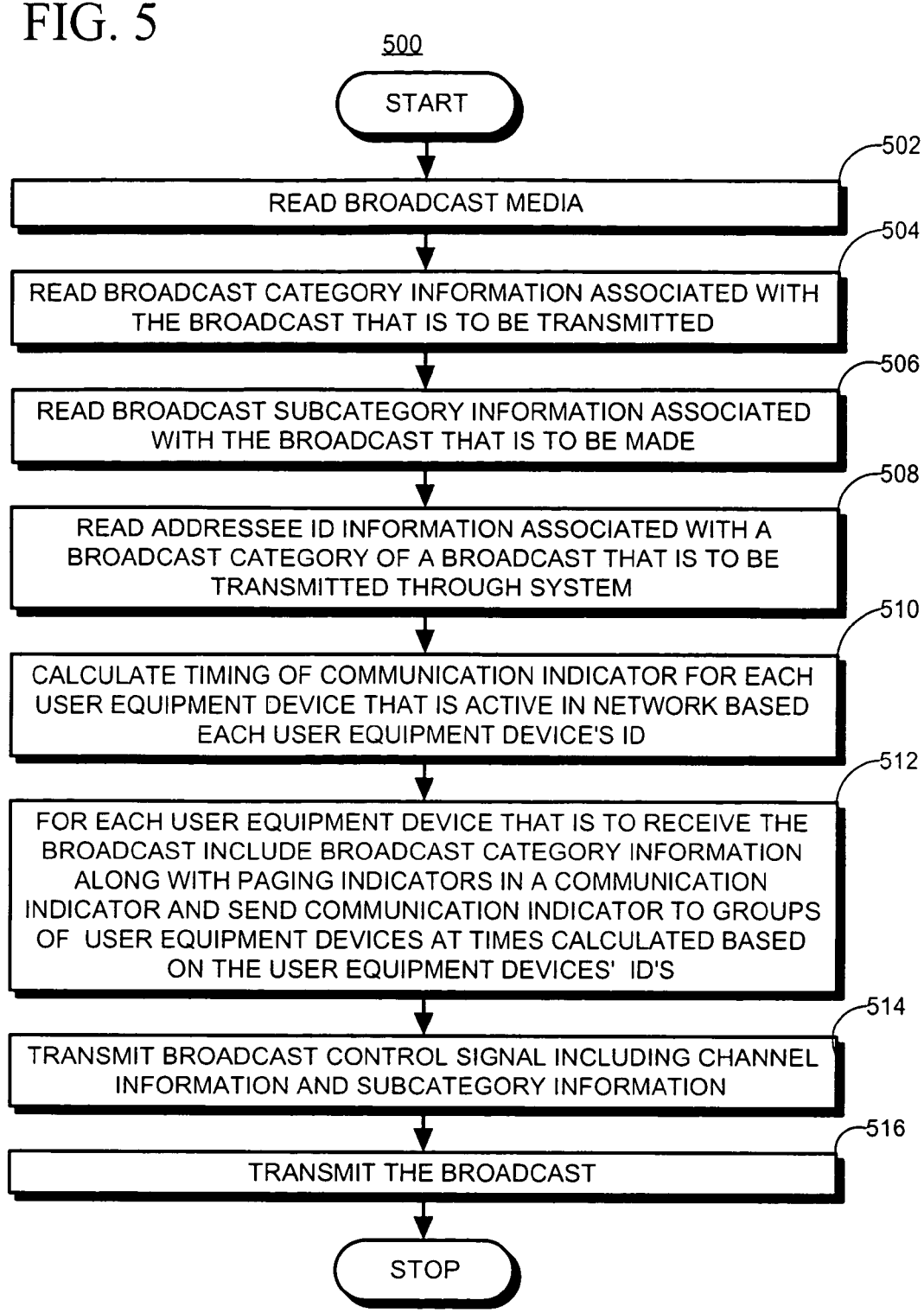
FIG. 5 is a flow chart of a second process conducted in the system shown in FIG. 1 including actions performed by network infrastructure.

FIG. 5 is a flow chart of a second process 500 conducted in the system 100 shown in FIG. 1 including actions that network infrastructure equipment is programmed to perform. The infrastructure of the system 100 is configured by software programming or hardware design to perform the second process 500. In block 502 media to be broadcast is read from, for example, a file, or through a network. In block 504 a broadcast category indicator that is associated with the broadcast that is to be transmitted is read. Each broadcast data file suitably includes or is associated with another file or data structure that includes one or more broadcast categories for the broadcast data file. In block 504 broadcast subcategory information that is associated with the broadcast is read. Broadcast subcategory information is also included or associated with each broadcast data file.

In block 508 addressee ID information that is associated with a broadcast category of the broadcast that is to be transmitted through the system 100 is read. The addressee ID information suitably comprises IMSI's of user equipment devices 116 that are subscribed to the broadcast, as recorded in block 406.

In block 510 the timing for sending the communication indicator 300 to each user equipment device 116 that is active in the wireless communication network 102 is calculated. The communication indicator 300 is suitably not transmitted continuously, but rather at a low duty cycle. In other words, there are substantial intervals between occasions at which the communication indicator 300 is transmitted. The timing for sending the communication indicator 300 to each user equipment device 116 is preferably indexed to the user equipment's IMSI which is a unique number identifying each user equipment device 116. The wireless network controller 118 will keep track of user equipment devices 116 that are within cells 104, 106, 108 under it's supervision, and will, when the need arises, execute block 510. Using the IMSI to calculate the timing for sending the communication indicator packet 300, allows the user equipment devices 116 to go into sleep mode in order to conserve battery power, and wake up at the time that the communication indicator 300 is being sent. Using the IMSI to calculate timing also allows transmission of the communication indicator 300 to different user equipment devices 116 to be distributed in time, thereby avoiding conflicts in demand for bandwidth. One suitable way in which the timing for sending the communication indicator 300 is indexed to the IMSI, is borrowed from the calculation of paging indicator timing in the UMTS. This method is described in Section 8 of 3GPP TS 25.304 a publication of the Third Generation Partnership Project.

In block 512 for each user equipment device that is to receive the broadcast, as determined in block 508, the broadcast category indicator code is included along with paging indicators in the communication indicator 300 and the communication indicator 300 is transmitted through the indicator channel 206 to groups of one or more user equipment device 116 at a times calculated based on the particular user equipment device's 116 ID (e.g. IMSI). Typically, if a large number of user equipment devices 116 are in the network 112, the transmit time assigned to a group of user equipment devices based on their ID's will be the same, and the communication indicator 300 will be transmitted to all devices in such a group at the same time. The time is suitably calculated in terms of system frame number.

In block 514 a broadcast control signal including channel information and subcategory information is transmitted through the broadcast control channel 208. As will be described below the broadcast control signal will only be processed by user equipment devices 116 that are subscribed to the category of broadcast as indicated in the broadcast category indicator code 304 transmitted in the communication indicator 300. Thus, devices 116 that are not subscribed to the category of broadcast transmitted in the broadcast category indicator code 304 save battery power that would be expended in processing the broadcast control signal.

In block 514 the broadcast itself if transmitted. Those user equipment devices 116 that based on comparing stored broadcast category and subcategory information to received category and subcategory information determined that they are subscribed to the broadcast will receive the broadcast transmitted in block 514.

Figure 6:
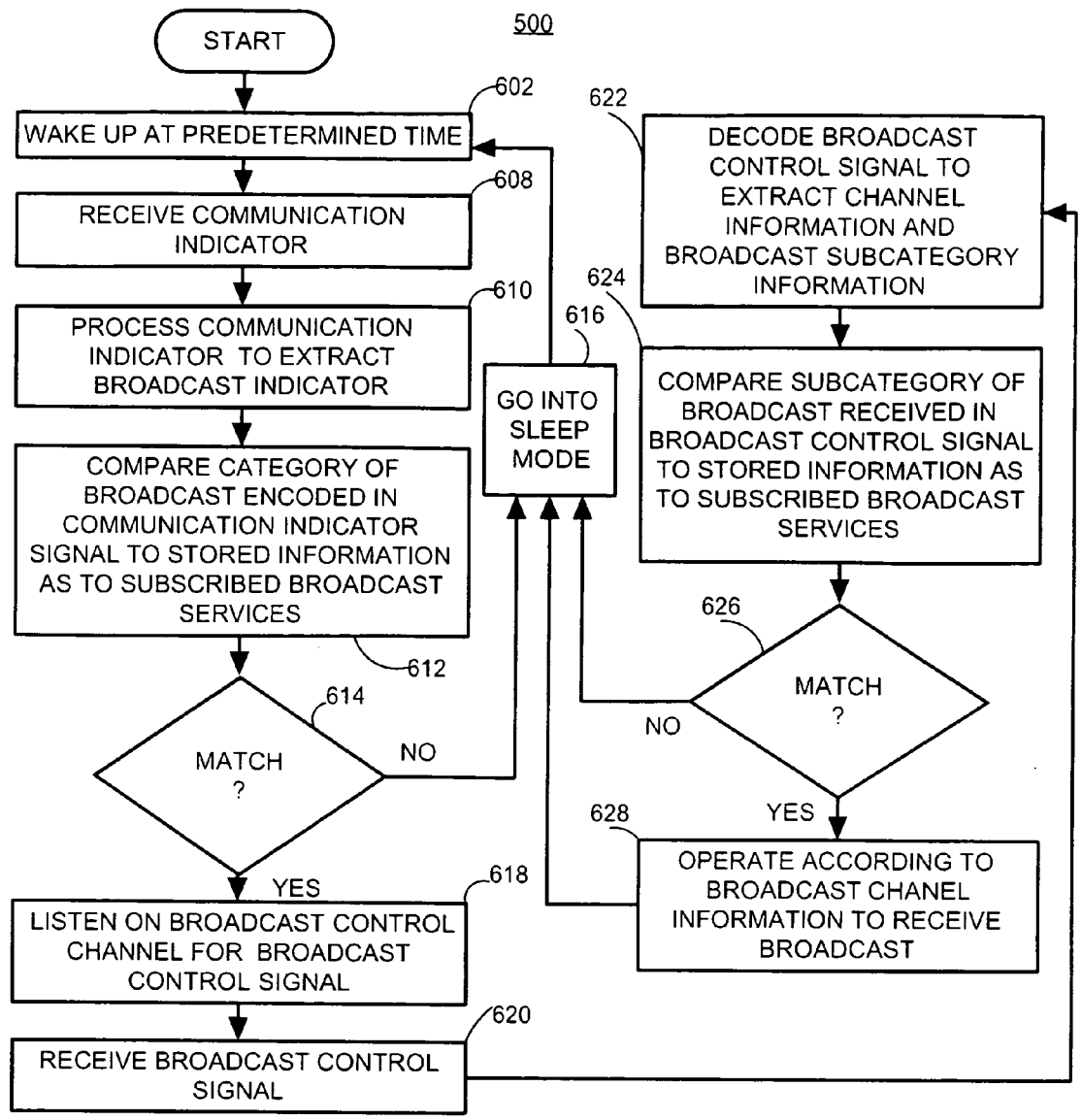
FIG. 6 is a flow chart of the second process conducted in the system shown in FIG. 1 including actions performed by a user equipment device.

FIG. 6 is a flow chart of the second process conducted in the system shown in FIG. 1 including actions that the user equipment devices 116 are programmed to perform. The steps shown in FIG. 6 are performed by each of the user equipment devices 116 in coordination with the steps shown in FIG. 5 that are performed by one or more parts of the infrastructure of the system 100. Referring to FIG. 6, in block 602, the user equipment device 116 wakes up at a predetermined time. The user equipment device 116 suitably wakes up slightly in advance of the time calculated based on the user equipment device's ID (e.g., IMSI) at which the communication indicator 300 is sent in order prepare to receive signals. In block 608 the user equipment device 116 receives the communication indicator 300. In block 610 the communication indicator 300 is processed to extract the broadcast category indicator code 304. (Note that at this time paging indicators can also be read for the purpose of determining if there is a point-to-point communication for the user equipment device 116). In block 612 a category of broadcast encoded in the broadcast category indicator code 304 of the communication indicator 300 is compared to information stored in the user equipment device 116 in block 410 of the first process shown in FIG. 4. Block 614 is a decision block, the outcome of which depends on whether the broadcast category indicator code 304 included in the communication indicator 300 matches the information stored in the user equipment device 116. If a match is not found, then the user equipment device 116 goes into sleep mode as indicated in block 616, and thereafter at the next predetermined time (which suitably is indexed to the users IMSI as previously discussed, and occurs periodically) once again wakes up as indicated in block 602. If on the other hand a match is found, then in block 618 the user equipment device 116 listens on the broadcast control channel 208 for the aforementioned broadcast control signal, and in block 620 the broadcast control signal is received. Note that by including the broadcast category indicator code 304 in the communication indicator 300, and making the block of listening for the broadcast control signal contingent upon there being a match between the received broadcast category indicator code 304, and prestored codes indicative of broadcast categories to which the user equipment device 116 is subscribed, battery power is conserved. Devices that are not subscribed to the category of broadcast indicated in the broadcast category indicator code 304 will not have to expend battery power listening for, receiving, and processing the broadcast control signal. Furthermore user equipment devices that conform to UMTS specifications, but do not support the use of the broadcast indicator code 304 will be unaffected by the broadcast indicator code. In block 622 the broadcast control signal is decoded to extract information about the broadcast including broadcast channel information and broadcast subcategory information. In block 624 the broadcast subcategory is compared to information as to subcategories of broadcasts to which the user equipment device 116 that is executing the process shown in FIG. 5 is subscribed. Block 626 is a decision block the outcome of which depends on whether a match is found between subcategory information received in the broadcast control signal, and subcategory information stored in the user equipment device 116 (in block 410, FIG. 4). If no match is found, the user equipment device 116 goes into sleep mode as indicated in block 616, and thereafter wakes up at the next predetermined time (indexed to the IMSI of the user equipment device). If on the other hand a match is found in block 626, then as indicated in block 628 the user equipment device 116 operates according to the broadcast channel information to receive the broadcast, and after the broadcast is received goes into sleep mode as indicated at 616, and thereafter wakes at a next predetermined time to check for other broadcasts.

According to an alternative embodiment, the subcategory information transmitted in the broadcast control signal is not used. In alternative embodiments, the broadcast category indicator code 300 identifies a specific broadcast as opposed to a plurality of broadcasts within a category. In this alternative the broadcast category indicator code shown in FIG. 3 is aptly renamed a broadcast identifier. After each broadcast assigned to a broadcast identifier has aired, the broadcast identifier is available to be reused for another broadcast. In this alternative embodiment, the first process shown in FIG. 4 can be performed for each broadcast that a user would like to receive.

Figure 7:
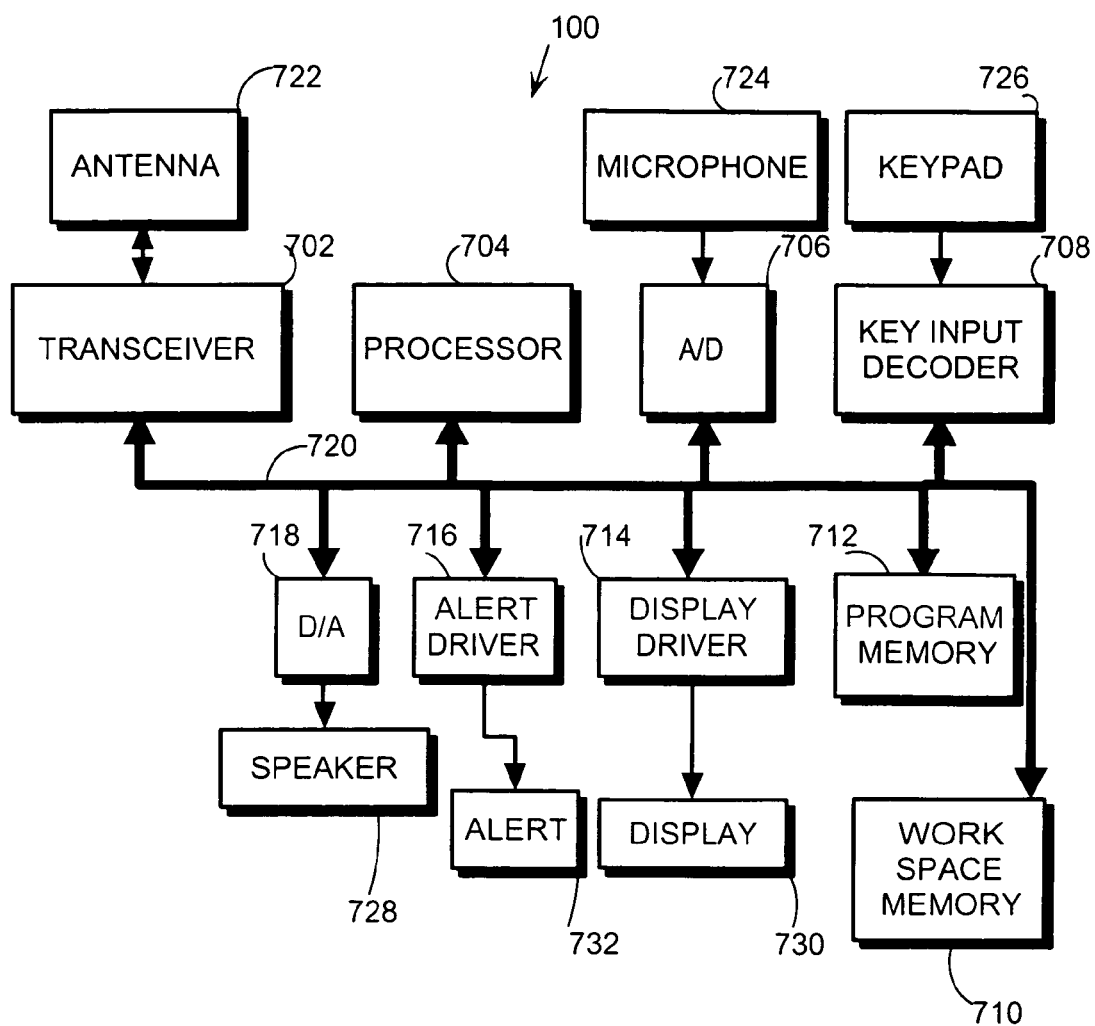
FIG. 7 is a functional block diagram of one of the user equipment devices used in the system shown in FIG. 1.

FIG. 7 is a functional block diagram of one of the user equipment devices 116 used in the wireless network 102. As shown in FIG. 7 the user equipment device 116 comprises a transceiver 702, a processor 704, an analog to digital converter (A/D) 706, a key input decoder 708, a work space memory 710, a program memory 712, display driver 714, an alert driver 716, and a digital to analog converter (D/A) 718 coupled together through a signal bus 720.

The transceiver module 702 is coupled to an antenna 722. Carrier signals that are modulated with data, e.g., audio data, pass between the antenna 722, and the transceiver 702.

A microphone 724 is coupled to the A/D 706. Audio, including spoken words, is input through the microphone 724 and converted to digital format by the A/D 706.

A keypad 726 is coupled to the key input decoder 708. The key input decoder 708 serves to identify depressed keys, and provide information identifying each depressed key to the processor 704.

The D/A 718 is coupled to a speaker 728. The D/A 718 converts decoded digital audio to analog signals and drives the speaker 728. The display driver 714 is coupled to the display 730.

The alert driver 716 drives an alert 732. The alert 732 is activated when wireless communication signals (e.g., a wireless telephone call, or optionally broadcasts are received by the user equipment device 116, in order to draw the user's attention to the received wireless communication signals. The alert 732 is suitably an audible alert or a tactile alert.

The program memory 712 is used to store programs that control the user equipment device 116, including a program that executes the process shown in FIG. 6. The programs stored in the program memory 712 are executed by the processor 704. The program memory is one type of computer readable medium. Other types of computer readable media can be used to store the program embodying the process shown in FIG. 6, such as for example hard disk drives, optical storage media, (e.g., Digital Versatile Disk, Compact Disk), and flash memory cards. Network circuits may also serve temporarily as computer readable media from which programs taught by the present invention are read.

The present invention, as would be known to one of ordinary skill in the art could be produced in hardware or software, or in a combination of hardware and software. The system, or method, according to the inventive principles as disclosed in connection with the embodiments, may be produced in a one system or plural coupled systems, having separate elements or means for performing the individual functions or steps described or claimed or one or more elements or means combining the performance of any of the functions or steps disclosed or claimed.

While the preferred and other embodiments of the invention have been illustrated and described, it will be clear that the invention is not so limited. Numerous modifications, changes, variations, substitutions, and equivalents will occur to those of ordinary skill in the art without departing from the spirit and scope of the present invention as defined by the following claims.

What is claimed is:

1. A method of operating a device in a wireless network to receive broadcast messages as well as point to point communications, the method comprising:
   waking up the device at a preprogrammed time;
   upon waking up at the preprogrammed time, receiving a first message that includes a broadcast indicator code that identifies a broadcast category or a specific broadcast;
   comparing the first broadcast indicator code to one or more stored codes indicative of broadcasts subscribed to; and
   in a first case that it is determined that the broadcast indicator code does not match any of the one or more stored codes going into sleep mode; and
   in a second case that it is determined that the broadcast indicator code matches one of the one or more stored codes, operating the device to receive the broadcast; and
   in the second case, prior to operating the device to receive the at least one broadcast;
   receiving a second message indicative of a subcategory of the broadcast; and
   comparing the subcategory of the broadcast to information indicative of subcategories to which the device is subscribed that is stored in the device, wherein operating the device to receive the broadcast is contingent upon a match being found between subcategory information received in the second message, and subcategory information stored in the device.

2. The method according to claim 1 wherein:
   waking up the device at the preprogrammed time comprises waking up the device at a preprogrammed time that is a function of an ID of the device.

3. The method according to claim 1 wherein:
receiving the first message comprises receiving a communication indicator that includes paging indicator symbols indicative of whether or not there is an incoming point-to-point communication for the device along with the broadcast indicator code.

4. The method according to claim 1 further comprising:
prior to waking up, receiving and storing the one or more stored codes.

5. A method of operating fixed infrastructure of a communication network to transmit broadcasts, the method comprising:
for each wireless device among a plurality of wireless devices to which a broadcast is to be transmitted:
determining a transmit time based on an ID of each of the wireless devices among the plurality of wireless devices;
at each transmit time transmitting a first message that includes a broadcast indicator code that identifies a broadcast category or a specific broadcast to one or more of the plurality of wireless devices having ID's corresponding to the transmit time; and
transmitting the broadcast to the plurality of wireless devices.

6. The method according to claim 5 further comprising:
after transmitting the first message and prior to transmitting the broadcast:
transmitting a second message that includes broadcast subcategory information.

7. The method according to claim 6 wherein transmitting the second message comprises:
transmitting channel information for the broadcast.

8. The method according to claim 5 wherein transmitting the first message comprises transmitting parity bits error for the broadcast indicator code.

9. The method according to claim 5 wherein transmitting the first message comprises:
transmitting information that indicates whether or not each of the plurality of wireless devices are intended recipients of a point-to-point communication.

10. The method according to claim 6 wherein transmitting the first message comprises:
transmitting paging indicator symbols along with the broadcast indicator code.

11. A user equipment device for use in a wireless communication network the device comprising:
a transceiver;
a memory for storing a program for the user equipment device;
a processor coupled to the transceiver, and to the memory, wherein the processor is programmed by the program to:
wake up the device at a preprogrammed time;
upon waking up at the preprogrammed time, receive a first message that includes a broadcast indicator code that identifies a broadcast category or a specific broadcast;
compare the broadcast indicator code to one or more stored codes;
in a first case that it is determined that the broadcast indicator code does not match any of the one or more stored codes going into sleep mode; and
in a second case that it is determined that the broadcast indicator code matches one of the one or more stored codes operating the device to receive the broadcast; and
in the second case, prior to operating the device to receive the broadcast,
receive a second message indicative of a subcategory of the broadcast; and
compare the subcategory of the broadcast to information indicative of subcategories to which the device is subscribed that is stored in the device, and operate the device to receive the broadcast if a match is found between subcategory information received in the second message, and subcategory information stored in the device.

12. The user equipment device according to claim 11 wherein:
in waking up the device at the preprogrammed time the processor is programmed to wakeup the device at a preprogrammed time that is a function of an ID of the device.

13. The user equipment device according to claim 11 wherein:
in receiving the first message the processor is programmed to receive a communication indicator that includes paging indicator symbols indicative of whether or not there is an incoming point-to-point communication for the device along with the first code.

14. The user equipment device according to claim 11 wherein the processor is programmed to:
receive and storing the one or more stored codes prior to waking up.

15. A communication system comprising infrastructure that is configured to:
for each wireless device among a plurality of wireless devices in the communication system to which a broadcast is to be transmitted:
determine a transmit time based on an ID of each of the wireless devices among the plurality of wireless devices
at each transmit time transmit a first message that includes a broadcast indicator code that identifies a broadcast category or a specific broadcast, to one or more of the plurality of wireless devices having ID's corresponding to the transmit time; and
transmit the broadcast to the plurality of wireless devices.

16. The communication system according to claim 15 wherein the infrastructure is configured to:
after transmitting the first message and prior to transmitting the broadcast:
transmit a second message that includes broadcast subcategory information.

17. The communication system according to claim 16 wherein the infrastructure is configured to
transmit channel information for the broadcast in the second message.

18. The communication system according to claim 15 wherein the infrastructure is configured to:
transmit parity bits error for the broadcast indicator code.

19. The communication system according to claim 15 wherein the infrastructure is configured to:
transmit information that indicates whether or not each of the plurality of wireless devices are intended recipients of a point-to-point communication in the first message.

20. The communication system according to claim 15 wherein the infrastructure is configured to:
transmit paging indicator symbols and the broadcast indicator symbols in the first message.

* * * * *